US007620101B1

(12) United States Patent
Jenkins

(10) Patent No.: US 7,620,101 B1
(45) Date of Patent: Nov. 17, 2009

(54) EQUALIZER CIRCUIT, COMMUNICATION SYSTEM, AND METHOD THAT IS ADAPTIVE TO VARYING LAUNCH AMPLITUDES FOR REDUCING RECEIVER ERROR

(75) Inventor: Julian Jenkins, Santa Cruz, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 659 days.

(21) Appl. No.: 10/950,274

(22) Filed: Sep. 24, 2004

Related U.S. Application Data

(60) Provisional application No. 60/505,706, filed on Sep. 24, 2003.

(51) Int. Cl.
*H04B 1/66* (2006.01)
(52) U.S. Cl. ............... 375/240; 375/229; 375/233; 375/287; 375/288
(58) Field of Classification Search .......... 375/240, 375/229, 233, 288, 287
See application file for complete search history.

(56) References Cited

U.S. PATENT DOCUMENTS

| 4,151,490 | A | | 4/1979 | Bazin |
| 5,267,266 | A | | 11/1993 | Chen |
| 5,940,441 | A | * | 8/1999 | Cranford et al. ............ 375/232 |
| 5,978,417 | A | * | 11/1999 | Baker et al. ............... 375/232 |
| 6,104,750 | A | | 8/2000 | Yiu |
| 6,205,170 | B1 | * | 3/2001 | Nunez Leon De Santos et al. ............ 375/219 |
| 6,438,162 | B1 | * | 8/2002 | Boyd et al. ............... 375/232 |
| 6,442,216 | B1 | * | 8/2002 | McLaughlin et al. ....... 375/322 |
| 6,452,443 | B1 | | 9/2002 | Thompson et al. |
| 6,744,330 | B1 | * | 6/2004 | Jones et al. ............... 333/28 R |
| 6,782,043 | B1 | * | 8/2004 | Dehghan et al. ........... 375/224 |

(Continued)

FOREIGN PATENT DOCUMENTS

WO    WO 03/009551 A1    1/2003

OTHER PUBLICATIONS

Shakiba, "A 2.5Gb/s Adaptive Cable Equalizer," 1999 IEEE International Solid-State Circuits Conference, 10 pages.

(Continued)

*Primary Examiner*—Shuwang Liu
*Assistant Examiner*—Kenneth Lam

(57) ABSTRACT

A transmission line equalizer, communication system, and method are provided for adaptively compensating for changes in transmission path length and transmission path medium. Within the equalizer is a filter that exhibits a high pass characteristic and, more specifically, has an inverse frequency response to that of the transmission path. The inverse filter can include a pair of amplifier stages coupled in parallel, with a mixer chosen to adaptively select portions of one stage over than of the other. The dual stage inverse filter can, therefore, adapt to greater transmission path lengths and/or attenuation. A feedback architecture is used to set the inverse filter response by measuring the amplitude of a communication signal output from the inverse filter during periods of low frequency. A peak detector will capture a peak-to-peak voltage value during those periods, and adjust the output of the slicer to match a launch amplitude of the communication signal. The peak detector within the feedback architecture helps ensure the predicted amplitude matches the launch amplitude to minimize over-compensation or under-compensation even though a different integrator might register no difference in integrated voltage or energy at the output of the inverse filter compared to the output of the slicer.

18 Claims, 7 Drawing Sheets

U.S. PATENT DOCUMENTS

| | | |
|---|---|---|
| 6,946,895 B2 | 9/2005 | Umeda et al. |
| 6,975,678 B1* | 12/2005 | Le et al. .................... 375/232 |
| 7,035,361 B2* | 4/2006 | Kim et al. .................. 375/350 |
| 7,065,134 B2* | 6/2006 | Papanikolaou et al. ...... 375/229 |
| 7,161,981 B2* | 1/2007 | Schenk ....................... 375/233 |
| 7,233,432 B2* | 6/2007 | Islam et al. ................. 359/337 |
| 2004/0005001 A1* | 1/2004 | Jones et al. ................. 375/232 |
| 2004/0172148 A1* | 9/2004 | Horibe ....................... 700/94 |
| 2004/0190661 A1* | 9/2004 | Vrazel ........................ 375/350 |
| 2006/0045176 A1* | 3/2006 | Moughabghab et al. ..... 375/232 |
| 2006/0098727 A1* | 5/2006 | Kuijk ......................... 375/232 |

OTHER PUBLICATIONS

Baker, "An Adaptive Cable Equalizer for Serial Digital Video Rates to 400Mb/s," 1996 IEEE International Solid-State Circuits Conference, 3 pages.

* cited by examiner

EQUALIZER CIRCUIT, COMMUNICATION SYSTEM, AND METHOD THAT IS ADAPTIVE TO VARYING LAUNCH AMPLITUDES FOR REDUCING RECEIVER ERROR

PRIORITY APPLICATION

This application claims priority to Provisional Application No. 60/505,706 entitled "Improved Equalizer Architecture," filed Sep. 24, 2003.

BACKGROUND OF THE INVENTION

1. Field of the Invention

The present invention relates to the field of data communication and, more particularly, to an equalizer circuit, communication system and method for receiving a communication signal sent across a transmission channel and for accurately recovering the communication signal having a wide variance of communication signal launch amplitude, wide performance fluctuations in the transmitter or equalizer, or the length/attenuation of the transmission channel.

2. Description of the Related Art

The following descriptions and examples are not admitted to be prior art or conventional by virtue of their inclusion within this section.

A data communication system typically involves a transmitter and a receiver connected by a transmission path. The transmitter may transmit modulated communication signals or communication signals that are coded. Popular types of modulation include pulse modulation, frequency modulation (e.g., frequency-shift keying), phase modulation (e.g., phase-shift keying), amplitude modulation (e.g., quadrature amplitude modulation), and numerous others. Popular types of coding include block codes and convolutional codes that encode digital information into a communication signal that can be sent across rather long transmission paths.

A transmission path can either be a wireless path or, alternatively, a "wired" path. Acceptable forms of a wired transmission path include electrical conductors, such as coaxial cables, unshielded twisted pair cables, shielded twisted pair cables, or fiber optic cables. A typical transmission medium exhibits a low pass characteristic. The low pass characteristic allows the transmission path to transmit low frequency components of a communication signal more readily than high frequency components of that signal. Thus, a transmission path has a frequency response that is not flat and, instead, has certain time dispersive functionality.

A modulated and/or coded communication signal sent across the transmission path generally consists of symbols. The symbols are often packed close to one another in a time domain. When the symbols are passed through the transmission line having a low-pass characteristic, the symbols can oftentimes spill over into each other causing what is known as "inter-symbol interference" or ISI.

To compensate for the low pass characteristic of the transmission path and to offset any occurrence of ISI, communication signals are typically passed through an equalizer circuit at the receiver end of the communication system. The equalizer is chosen as having a high-pass characteristic and, ideally, has a frequency response that is exactly inverse to that of the low-pass transmission path.

In most practical applications, the low-pass characteristic of the transmission path can change depending on the media used, as well as the length of the transmission path. As the transmission path changes, it is beneficial that the equalizer also change to avoid under-compensation (undershoot) or over-compensation (overshoot). There are several mechanisms used to compensate for transmission line changes. For example, the equalizer can be designed with a particular transmission line in mind. Knowing the transmission line characteristic will thereby allow the manufacturer to pair a more appropriate equalizer to that line. Alternatively, the frequency response of a transmission line can be measured during operation, and the equalizer high pass characteristic can be changed or adapted to any such measured change.

One problem with the first approach is the implausibility in having to redesign and substitute different equalizers whenever the transmission path changes. Moreover, it is often difficult to maintain accurate matching between the transmission path and the equalizer if either one of those components should change with changes in fabrication processes, or changes in temperature or voltage during operation. If the second approach is to be used, most conventional adaptive equalizers have a limited range to which they can adapt. For example, an adaptive equalizer cannot provide a matching inverse frequency response if the transmission path extends beyond a maximum range. Alternatively, the same can be said if the transmission path is shorter than a minimum range. In addition, adaptive equalizers are oftentimes limited to communication signals that fall within an amplitude range. If a communication signal amplitude extends outside that range, then exact equalization may not be possible.

Therefore, a need exists in having an equalizer that can produce a more exact inverse frequency response to match the transmission path, regardless of the length of that path or the amplitude of the communication signal transferred across that path. The desired equalizer, when placed in a communication system, can adapt to any of the various characteristics of the transmission path, and can also apply the appropriate gain and rolloff characteristics in order to minimize any high frequency noise, jitter, and distortion of the symbols that cause the loss or incorrect communication of recovered information.

SUMMARY OF THE INVENTION

The problems outlined above are in large part solved by an improved equalizer circuit, communication system, and method hereof. The equalizer circuit preferably includes an improved inverse filter according to one embodiment, and/or an improved low pass filter with peak detector in feedback according to another embodiment.

According to the first embodiment, the inverse filter can consist of two filters placed in parallel whose output is mixed by a variable mixer. The gain and frequency response of one of the parallel-connected filters can be adjusted along with the degree of mixing by the mixer. The adaptive filter and adaptive mixer can, therefore, be used to accommodate rather substantial differences in transmission path lengths and media composition. The feedback arrangement can be used in conjunction with the improved inverse filter or altogether separate from the improved filter.

According to the second embodiment, the low-pass filter and a peak detector captures the peak-to-peak amplitude of the communication signal sent into the transmission path. Once the peak amplitude is known (prior to any low-pass filtering by the transmission path), then a decision circuit can be used to compare the inverse-filtered communication signal to a threshold voltage to set the logic high and logic low voltage values that will be output from the receiver. The comparison circuit, henceforth known as a "slicer" can have a variable boost depending on the measured peak voltage of the communication signal. In this fashion, the feedback circuit ensures that the amplitude forwarded to the slicer will match the amplitude output from the slicer. Having the same amplitude will prevent an energy difference integrator from reading overshoot or undershoot as having no energy difference and, thus, substantially eliminating over-compensation and under-compensation.

In the first embodiment of having an improved inverse frequency response filter (hereinafter "inverse filter") in the equalizer, varying transmission path lengths and varying transmission path media can be accommodated beyond certain maximums and minimums offered by conventional pre-designed or adaptive equalizers. The inverse filter includes a first filter and a second filter. The first and second filters have different gain outputs and frequency responses from one another. Preferably, the second filter has a frequency response that is less than the frequency response of the first filter. Also, preferably, the first filter can have a variable gain. In addition to the first and second filters, a mixer is used to couple the outputs of those filters. The first and second gain outputs and frequency responses emanating from the first and second filters, respectively, can be mixed in varying proportions depending on the frequency response of the transmission path. Thus, the first filter and the mixer each include an input which can receive a feedback signal to adjust the gain of the first filter and the varying proportions of the first and second gain outputs within the mixer. The feedback signal arrives first upon the first filter, and then the mixer, in succession until the appropriate inverse frequency response is obtained across the slicer circuit.

In the second embodiment, the feedback circuit which controls the inverse filter includes not only a slicer circuit, but also a voltage detector (i.e., peak detector) coupled to the output of the low-pass filter. The peak detector can measure the peak-to-peak amplitude of the communication signal at the output of the low-pass filter to adjust a DC output from the inverse filter. The adjustment can occur by forwarding the peak detector output to an input of the inverse filter or, alternatively, to an input of the slicer circuit. Regardless of where the peak detector output is connected, the amplitude of the communication signal "launched" from the transmitter is measured via the low-pass filter. The inverse filter or slicer is driven by the peak detector to produce corresponding matched amplitude at the output of the inverse filter or slicer. By matching the launch amplitude within the equalizer, any undershoot or overshoot caused by respective under-compensation or over-compensation can be eliminated across a relatively wide launch amplitude range.

The first embodiment describing an improved inverse filter can be used with or without the second embodiment of an improved feedback mechanism for adjusting gain and/or frequency response of that inverse filter. Preferably, however, both embodiments can be implemented into a single communication system to achieve a more optimal result. That result being one which performs closer matching of the inverse filter transfer function to that of the transmission path by minimizing baseline wander with variations in communication signal pattern density, and thus minimizing the resulting deleterious jitter and noise in the recovered signal.

BRIEF DESCRIPTION OF THE DRAWINGS

Other objects and advantages of the invention will become apparent upon reading the following detailed description and upon reference to the accompanying drawings in which.

Figure 1:
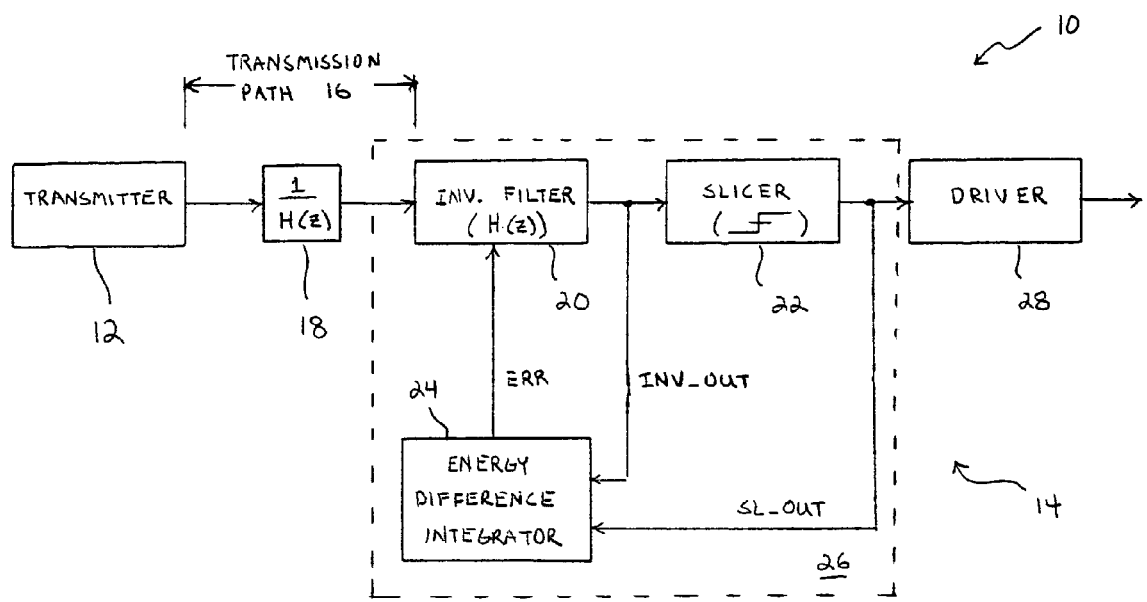
FIG. 1 is a block diagram of an equalizer coupled to receive a communication signal sent from a transmitter across a transmission channel.

While the invention is susceptible to various modifications and alternative forms, specific embodiments hereof are shown by way of example in the drawings and will herein be described in detail. It should be understood, however, that the drawings and detailed description thereto are not intended to limit the invention to the particular form disclosed, but on the contrary, are intended to cover all modifications, equivalents, and alternatives falling within the spirit and scope of the present invention as defined by the appended claims.

DETAILED DESCRIPTION OF PREFERRED EMBODIMENTS

Turning now to the drawings, FIG. 1 illustrates a communication system 10 that comprises a transmitter 12, a receiver 14, and a transmission path 16. Transmitter 12 can be any electronic subsystem that produces a modulated and/or coded communication signal across path 16. Path 16 is connected between transmitter 12 and receiver 14, and includes either a wireless or wired transmission medium. As shown in block 18, transmission path 16 exhibits a low-pass characteristic of transmitting low frequency components more readily than high frequency components of the communication signal. High-pass characteristic is denoted as H(z) and, thus, low-pass characteristic is represented in block 18 as 1/H(z).

To compensate for the low-pass characteristic shown in block 18, an inverse filter having a high-pass characteristic H(z) is shown in block 20. Coupled to the output of inverse filter 20 is a comparator, or slicer 22. Slicer 22 compares the output from filter 20 to a threshold voltage to determine whether the output from slicer 22 will be at a logic high voltage value or a logic low voltage value. The output from filter 20 (INV_OUT) and the output from slicer 22 (SL_OUT) are fed into an integrator 24. Integrator 24 generates the integral with respect to time of the difference in voltage between INV_OUT and SL_OUT. When there is no difference in voltage over time, then the output error (ERR) signal will be zero. However, if SL_OUT exceeds INV_OUT, then integrator 24 will produce a positive ERR signal to boost the filter 20 output so that, eventually, INV_OUT will match SL_OUT.

The feedback arrangement of integrator 24 in combination with the input and output of slicer 22 represents an adaptive equalizer and, therefore, the components shown in dashed line are representative of an equalizer circuit 26. Coupled with feedback via the error (ERR) signal, filter 20 will automatically adjust its response to the gain supplied by the error signal. The continual adjustment will eventually resolve to an error signal that is zero so that, hopefully, ISI of the communication signal symbols are eliminated. Those symbols are then reconstructed at the output of driver circuit 28.

Figure 2:
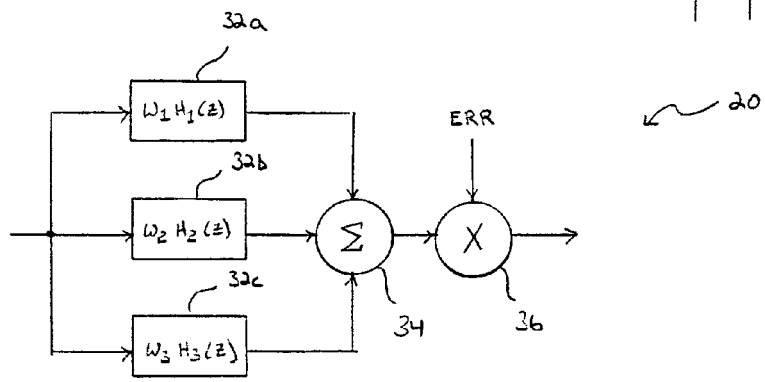
FIG. 2 is a detailed block diagram of a filter within the equalizer of FIG. 1, wherein the filter has an inverse frequency response ("inverse filter") to that of the transmission channel and also has an adjustable gain controlled by an error signal sent from the integrator of FIG. 1.

FIG. 2 illustrates in more detail one example of an inverse filter 20. Filter 20 can have possibly two or more high-pass filters $H_1(z)$, $H_2(z)$, etc. The high-pass filters can each be weighted in some fashion to provide a frequency boost in different proportions, with the weight shown as $W_1$, $W_2$, etc. The weighted high-pass filters are shown in blocks 32a, 32b, and 32c. Each block 32 may have zeros and poles different from one another, which may be weighted and summed at node 34 to construct an arbitrary inverse filter response. Adapting the filter to varying cable lengths can be accomplished by adjusting weights Wn or, more preferably, by adjusting the mixer output gain for a pre-established set of weights via error signal presented to mixer 36. While the individual weights can be each selectively adjusted to more closely emulate the transmission path frequency response, the error signal can be used to mix appropriate proportions of each weighted stage to arrive at the optimal inverse frequency response of preset weights. Regardless of whether the mixing occurs in the weights themselves, or in the mixer which applies preset weights, inverse filter 20 is adaptable to different transmission path lengths and media composition using the feedback error signal.

The slicer 22 of FIG. 1 can have a fixed output amplitude or, if necessary, variable as will be shown herein below. Slicer 22 serves to reconstruct or predict the communication signal input to the transmission path. When the energy at the output of slicer 22 is greater than the energy at the output of inverse filter 20, then the communication signal is deemed to be under-compensated or under-equalized. A disadvantage of having a fixed slicer 22 output is that equalizer 26 is less tolerant to greater communication signal amplitude range. A designer wishing to use a slicer 22 of fixed output must predict the launch amplitude sent by the transmitter into the transmission path 16. The predicted amplitude of the output of slicer 22, however, varies with process, voltage, and temperature changes within the communication system, making it difficult to design a circuit that will work reliably across all process, voltage, and temperature corners.

Figure 3:
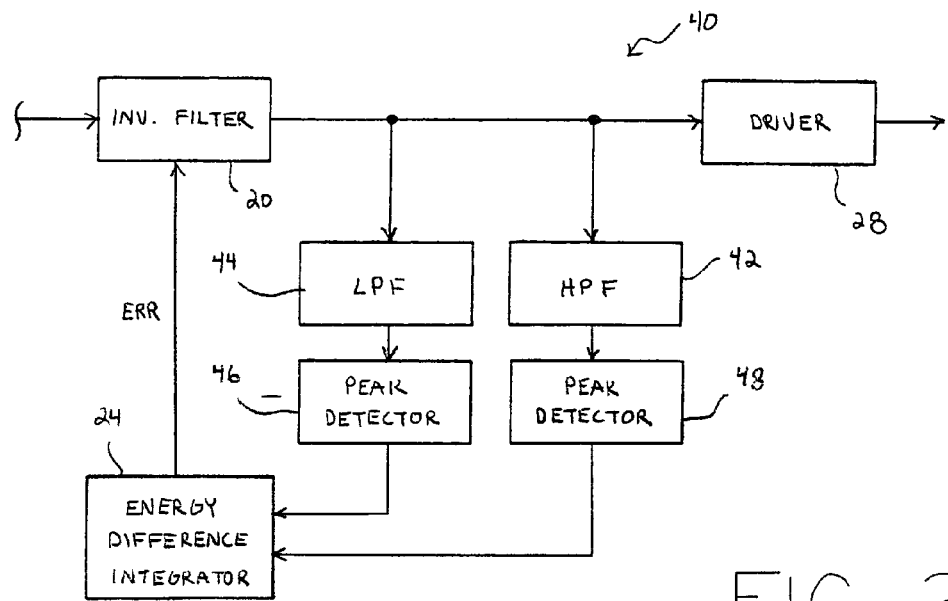
FIG. 3 is a block diagram of an equalizer that can accommodate a greater amplitude range of the launch communication signal ("launch amplitude") than the equalizer of FIG. 1.

FIG. 3 illustrates another equalization function slightly dissimilar from equalizer 26 of FIG. 1. Equalizer 40 of FIG. 3 has many of the same elements as equalizer 26, including inverse filter 20, integrator 24, and driver 28. One difference, however, is the inclusion of a high-pass filter 42, a low-pass filter 44, and a pair of peak detectors 46 and 48. Integrator 24 serves to detect differences in energy between the high and low frequency peak-to-peak voltages. The error signal modifies the inverse filter 20 frequency response and gain so that the amplitudes of the high and low frequency components of the predicted output are the same. The output of the transmission path and inverse filter 20 can now be made substantially flat across the entire bandwidth of interest and, thus, the signal is equalized. One disadvantage of equalizer 40 in FIG. 3 is that while it is tolerant to a wide amplitude range, equalizer 40 has a rather narrow range of acceptable data transmission rates. Thus, equalizer 40 is unsuitable for transmission rates that extend outside a rather limited band. Moreover, unless the slicer 22 of FIG. 1 can be adapted, equalizer 26 of FIG. 1 is not well-suited to communication signals that have a wide amplitude range.

Figure 4:
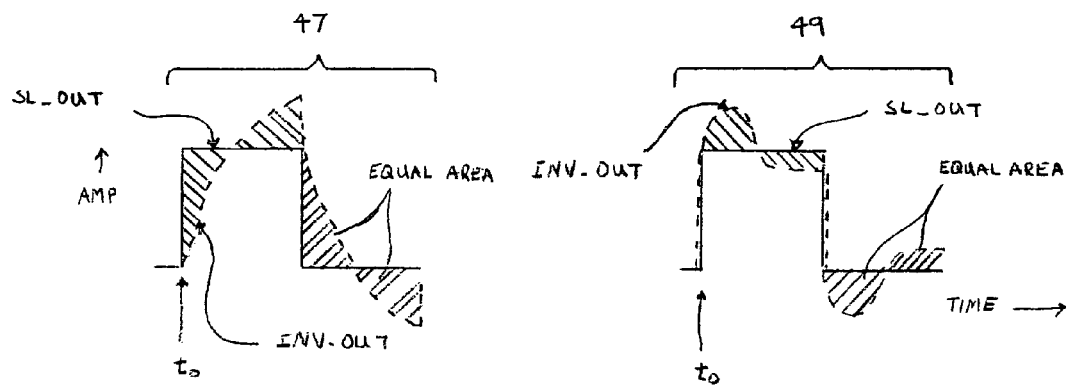
FIG. 4 is a timing diagram of a recovered communication signal that becomes distorted whenever the launch amplitude is greater than, or DC-skewed relative to, the amplitude of the communication signal at the output of the slicer ("slicer amplitude") or the amplitude of the communication signal at the output of the inverse filter ("filter amplitude")

FIG. 4 illustrates the waveforms at the output of inverse filter 20 (INV_OUT) and the output of slicer 22 (SL_OUT) for the equalizer circuit 26 shown in FIG. 1. In particular, FIG. 4 illustrates how under-compensation and/or over-compensation may still exist after the integrator reaches a steady state, even when there is no error condition (ERR) on the output of the integrator (i.e, there is no energy difference between INV_OUT and SL_OUT after steady state time $t_0$).

FIG. 4 is broken into two different scenarios of under-compensation (undershoot) during time 47 and over-compensation (overshoot) during time 49. As shown in the under-shoot scenario 47, the cross-hatched area between SL_OUT and INV_OUT is equal for each cycle, thus registering as having equal energy within the integrator 24 even though severe under-compensation might exist. Likewise, as shown in the overshoot scenario 49, the cross-hatched area between SL_OUT and INV_OUT is equal for each cycle to denote equal energy within integrator 24, yet over-compensation exists. Scenario 47 is characteristic of the slicer output (SL_OUT) being less than the launch amplitude (i.e., the amplitude at the output of transmitter 12). Conversely, scenario 49 is characteristic of the slicer output being greater than the launch amplitude. Unfortunately, FIG. 4 shows that the amplitudes of the slicer output (SL_OUT) and the low frequency amplitudes of the inverse filter output (INV_OUT) are not matched. Thus, FIG. 4 demonstrates the importance of matching the predicted amplitude at the output of the slicer with the launch amplitude at the output of the transmitters so that the inverse filter output amplitude will match the slicer output amplitude, thereby ensuring that the integrator will not force an undershoot or overshoot condition.

Figure 5:
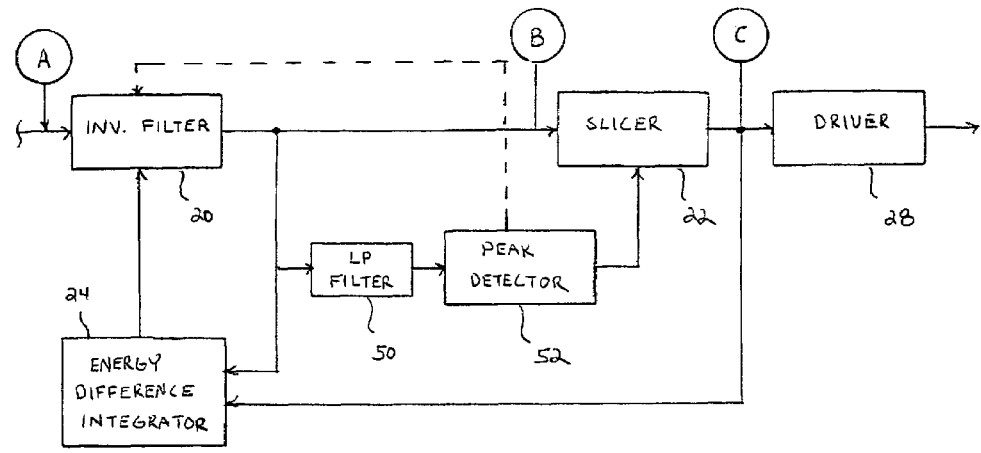
FIG. 5 is a block diagram of an equalizer according to one embodiment having a low pass filter and peak detector for capturing a peak-to-peak amplitude of low frequency data bits within the communication signal and for adjusting the slicer and/or inverse filter output so that slicer amplitude or filter amplitude matches the launch amplitude.

FIG. 5 illustrates an improved equalizer architecture that matches the launch and predicted amplitudes by sampling the launch amplitude and detecting a peak voltage value. Once the peak voltage value is determined, the slicer output can be adjusted so that the predicted amplitude at the output of the slicer can match the launch amplitude coming from the transmitter. This forces the integrator to make the amplitude from the inverse filter the same as the amplitude from the slicer and, thus, there would not be a shaded difference in the waveforms as shown in FIG. 4.

The output of inverse filter 20 is presented not only to slicer 22, but also to a low-pass filter 50. Filter 50 measures the amplitude of the communication signal during times in which there are relatively few transitions on that signal. For example, several modulated logic 1 voltage values in sequence might represent a low frequency amplitude that is measured by filter 50. This allows the peak-to-peak launch amplitude to be measured accurately by filter 20 and maintained at the output of peak detector 52. The low frequency portion of the communication signal will thereby most closely match the launch amplitude since the low frequency portion is less affected by transmission path attenuation or receiver equalization. Even in transmission media that have a rather significant low-pass frequency response, a series of 1s or 0s that registers as a lengthy logic 1 or logic 0 voltage value will be received, and that value can be measured by filter 20 and detector 52. The low frequency portion of the communication signal can then be used as a prediction of the launch amplitude, and thus forwarded to slicer 22.

Using the output from peak detector 52, the amplitude from slicer 22 can be controlled to be the same as the predicted launch amplitude. Slicer 22 shown in FIG. 5 is one having an adjustable gain. The matching of amplitudes allows integrator 24 to find a more precise equalization. This has the benefits of reducing overshoot and undershoot and, thus, lowering the system bit error rate (BER), which results in a superior and more attractive product. Alternatively, instead of placing the output from peak detector 52 into slicer 22, the output can be fed into inverse filter 20. For example, the output can be placed into an amplifier at the output stage of filter 20 or, alternatively, fed directly into the weighted inputs. The measured peak voltage value can be used to control the DC gain of the adaptive inverse filter 20, in lieu of controlling the gain from the slicer. If the inverse filter has a variable gain, then the slicer need not have a variable amplitude output, but rather can have a fixed amplitude. The inverse filter 20 thereby suffices as having the variable amplitude output with the peak-to-peak amplitude measurement coupled directly to an input of the inverse filter 20 to control its variable amplitude output.

Figure 6:
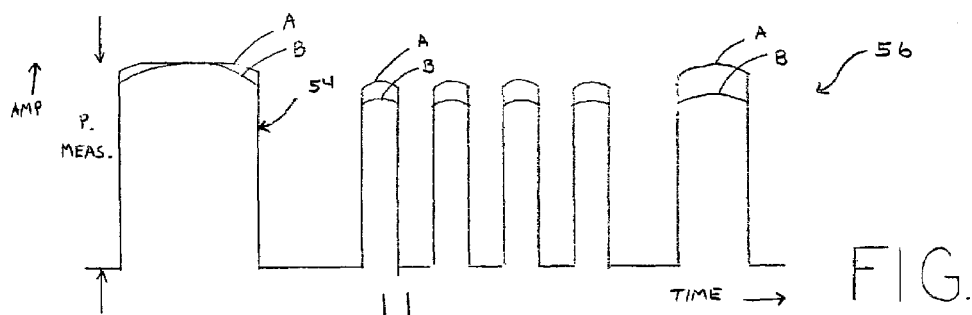
FIG. 6 is a timing diagram of attenuation of the launch amplitude received upon and output from the inverse filter due to performance fluctuations within the transmitter, transmission channel and/or inverse filter.

FIG. 6 illustrates exemplary waveforms at points A and B of FIG. 5. Specifically, low frequency portions 54 of the communication signal 56 equalized at the output of filter 20 can be measured. The peak measurement (P. MEAS.) is determined on the low frequency portions 54 since a peak voltage can be established that more closely matches the launch amplitude. As shown, the higher frequency portions may not achieve a peak value due to the low frequency characteristics of the transmission path. This is especially true if there are additional process, voltage, and temperature fluctuations occurring in the inverse filter 20 that would cause an additional dampening effect as shown by the difference between waveforms A and B. Nonetheless, even such fluctuations would have little effect on the low frequency portions 54, as opposed to the higher frequency portions shown.

Figure 7:
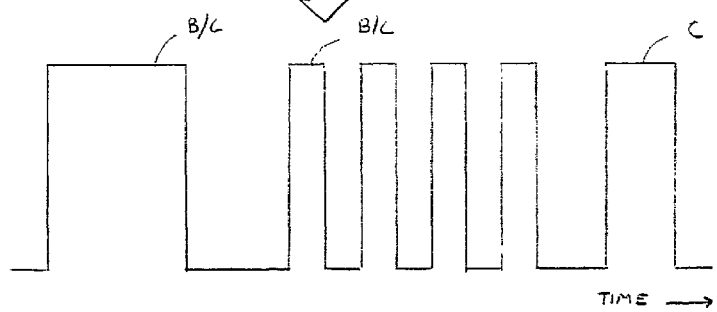
FIG. 7 is a timing diagram of the low pass filter and peak detector of FIG. 5 boosting slicer amplitude or filter amplitude to match the launch amplitude and thereby minimize bit error at the output of the equalizer.

By adjusting the slicer 22 output to match the launch amplitude, eventually integrator 24 will drive filter 20 output amplitude to match the slicer output amplitude, as shown by waveforms B and C of FIG. 7. Waveform C will essentially be one which has little, if any, overshoot or undershoot as opposed to the waveform of FIG. 4 derived absent filter 50, detector 52, and variable output slicer 22 of FIG. 5.

Figure 8:
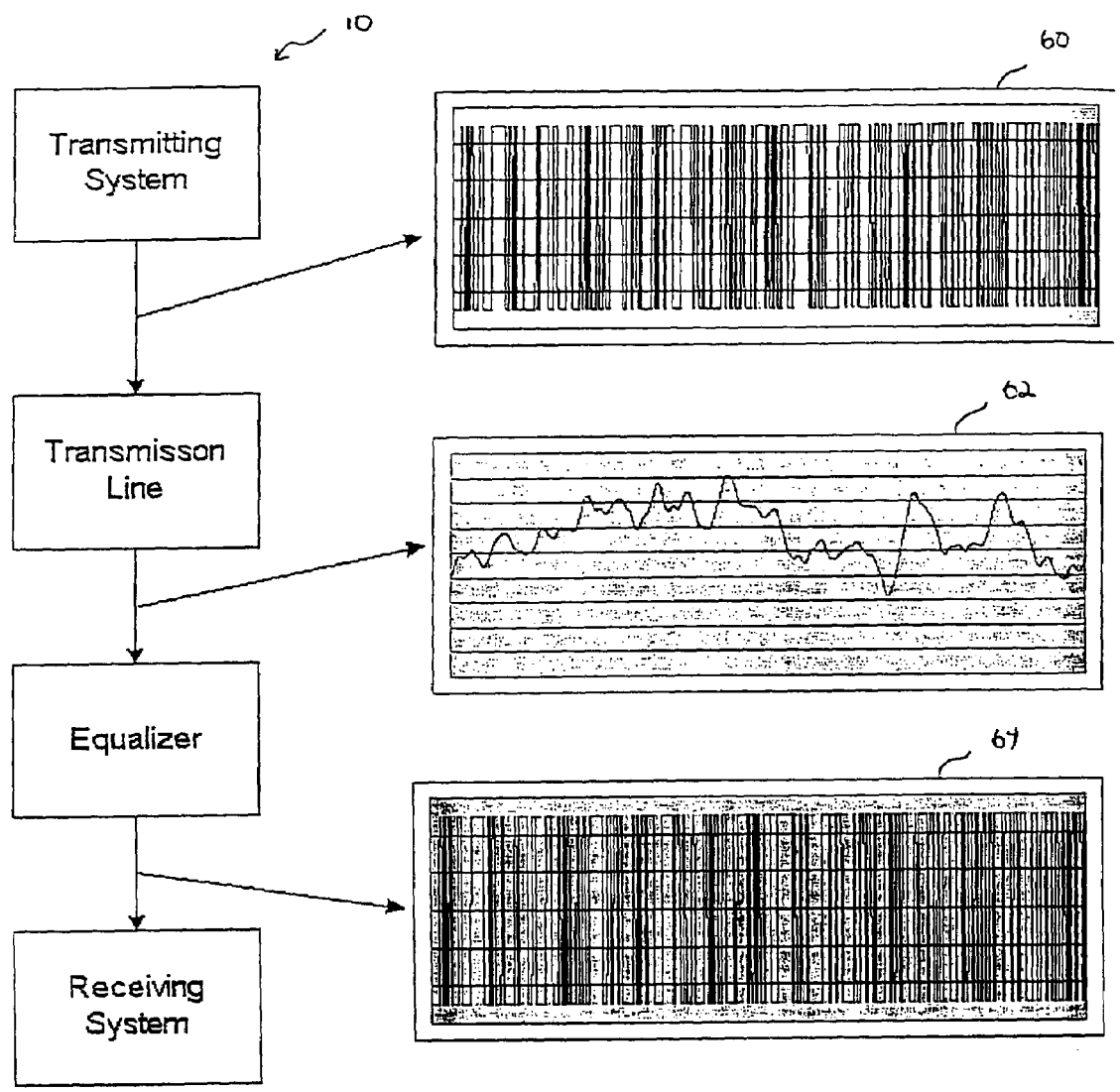
FIG. 8 is a timing diagram of a communication signal forwarded through the transmitting system and recovered by the receiving system when the equalizer of FIG. 5 is employed.

FIG. 8 illustrates a communication system 10 and the various waveforms 60, 62, and 64 output from the transmitter, transmission line, and equalizer of system 10. In particular, the launch amplitude 60 is forced to be equal to the predicted amplitude 64 at the output of the slicer circuit using the equalizer of FIG. 5. In doing so, the receiving system will be assured that there is minimal over-compensation (overshoot) or under-compensation (undershoot) placed into the receiver. This is true even though there might be significant attenuation in the transmission line, as well as baseline wander and possibly high frequency jitter presented on waveform 62.

Turning now to FIGS. 9-16, an alternative embodiment is presented. In this embodiment, the inverse filter function is enhanced by using a more variable inverse filter compensation mechanism internal to that filter. Previously, however, the feedback mechanism was enhanced as shown in FIGS. 5-7. While feedback improvement using a peak detector will allow a more adaptive equalizer to varying launch amplitudes, improvements in the inverse filter might be needed to achieve a wider inverse filter frequency function whenever significant changes in cable length or transmission medium occur.

Figure 9:
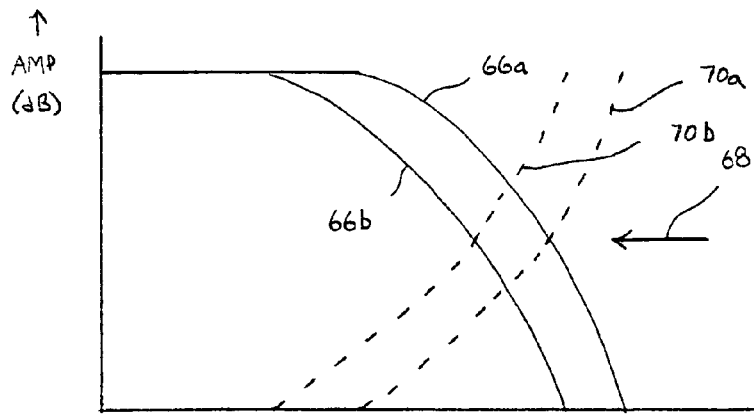
FIG. 9 is a frequency response of the transmission channel at varying lengths, and the desired frequency response of the inverse filter of FIG. 2.

FIG. 9 is a plot showing the frequency response of the transfer function of a transmission path shown in solid line, labeled as reference numerals 66a and 66b. As the length of the transmission path increases, as shown by arrow 68, the low-pass function becomes more predominant since the frequency response curve will move from 66a to 66b. To equalize the low-pass characteristic, an equalizer is needed that will produce an inverse frequency response to that of the transmission line. Accordingly, as the transmission line or path increases, the inverse frequency response will transition from the dashed curve 70a to 70b. FIG. 9 illustrates the importance of a transmission line equalizer to adapt to changes in the transmission path to assure successful compensation for a communication signal received upon a receiver. The predominant factor is assuring successful compensation is to adaptively design the equalizer and, specifically, the inverse filter.

An improvement in inverse filter design is one that can adapt its frequency response to better match that of a changing transmission path, regardless of the specific media used or the length of the transmission path. As described in FIGS. 1 and 2, one technique used to vary the inverse frequency response is to vary the mixture of dissimilarly weighted high-pass filters. An error signal can be used to vary that mixture and the error signal is selected based on differences in energy at the output of the inverse filter and the output of the slicer. Depending on the pre-selected weighting of each filter stage, however, the amount of adaptability can sometimes be limited.

Figure 10:
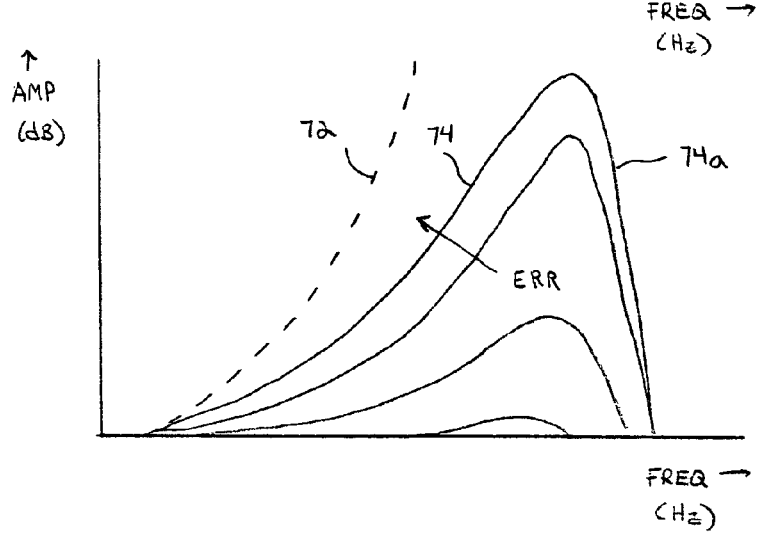
FIG. 10 is a frequency response of a relatively long transmission channel and gain placed on the output of the inverse filter of FIG. 2 to offset for attenuation of the launch amplitude.

FIG. 10 illustrates a desired inverse frequency response for a lengthened transmission path, as shown by dashed curve 72. If the amount of lengthening becomes too large, then any gain, or lower frequency boost, of the inverse filter via an increase in the error signal (ERR) magnitude, may still be insufficient to match the inverse lower frequency response of the added transmission path. FIG. 10 thereby illustrates possibly a maximum gain amount shown by curve 74 at the output of the inverse filter, yet still insufficient to match with curve 72. Moreover, curve 74 illustrates a roll-off 74a that is at a much higher frequency than curve 72. The higher roll-off will assure that higher frequency noise and jitter at the rising and falling edges of the recovered communication signal will still be present and not removed by the inverse filter. It would, therefore, be desirable to introduce an improvement to the inverse filter that can achieve a wider degree of adaptability, yet with better-matched and possibly lower frequency rolloff.

Figure 11:
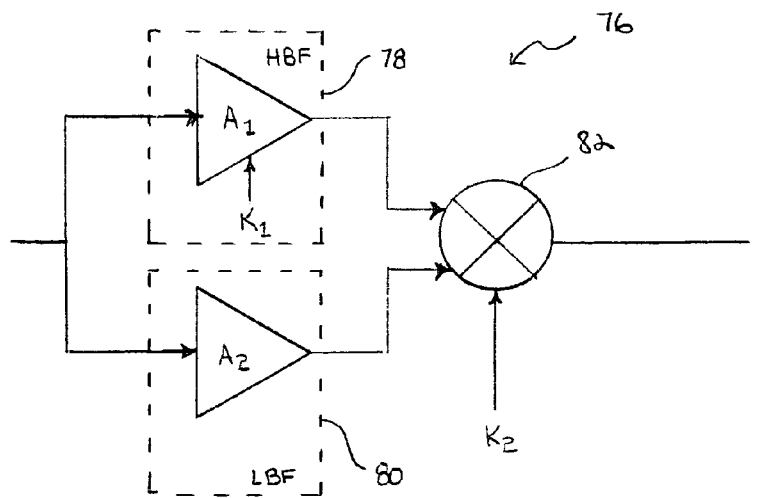
FIG. 11 is an inverse filter that can accommodate a wider range of transmission channel length by mixing a low pass filter and a variable gain high pass filter, each having dissimilar rolloff frequency to eliminate high frequency noise and jitter.

FIG. 11 illustrates such an improvement. In particular, FIG. 11 illustrates an inverse filter 76 that has two filters 78 and 80 coupled in parallel to receive the communication signal sent across the transmission path. Filter 78 and 80 can each be formed with multiple stages and a summing node, similar to the architecture of FIG. 2. Filter 78 can have one or more of its stages weighted so that its gain, or boost, is greater in a higher frequency band than filter 80. Thus, relatively speaking, filter 78 is a high-boost filter (HBF) and filter 80 is a low-boost filter (LBF). Filter 80 still passes the same frequencies as filter 78. Filter 80 preferably contains no mechanism in which to change either the filter function gain. Filter 78, on the other hand, has an input by which its gain can be adjusted by signal $K_1$. Coupled to the outputs of filters 78 and 80 is a mixer circuit 82 that mixes portions of those outputs based on a ratio set by input signal $K_2$.

Figure 12:
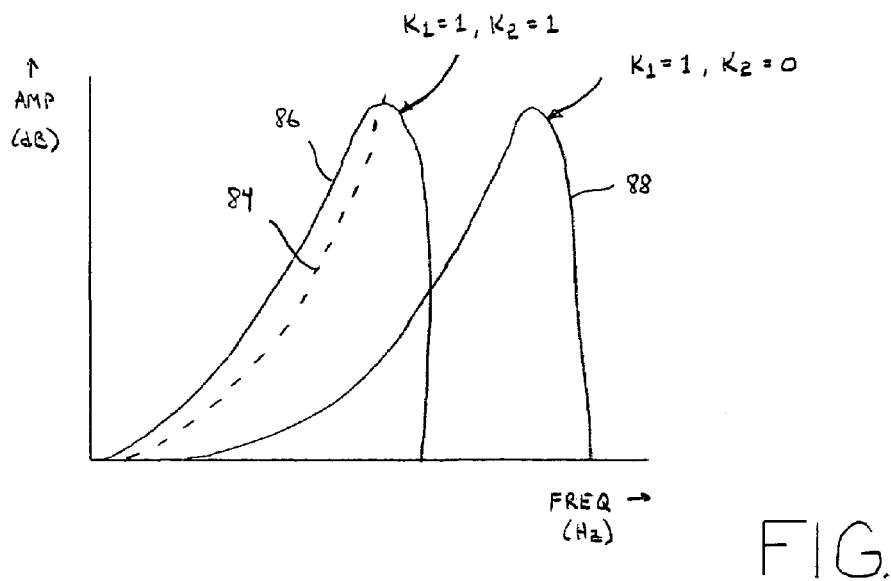
FIG. 12 is a frequency response of the inverse filter of FIG. 11.

FIG. 12 illustrates operation of inverse filter 76 shown in FIG. 11. If the inverse frequency function of the cable is shown by dashed line 84, then a more desirable frequency response for the inverse filter is achieved by curve 86, rather than by curve 88. Curve 88, however, is achievable if only filter 78 is used, with the output amplified by maximizing $K_1$. Thus, curve 88 is the best that can be achieved absent implementation of a second, parallel-coupled filter as shown in FIG. 11. By introducing a mixer circuit 82 (FIG. 11), and driving input signal $K_2$ to its maximum voltage value, output from lower-pass filter 80 can be selected in lieu of output from higher-pass filter 78. This selection process can occur along the spectrum between curves 88 and 86 to be able to select an inverse frequency response that more closely matches the inverse frequency response of the transmission path 84. In addition, the roll-off at the right-hand side of each curve can be tailored more specific to the transmission path to minimize passage of higher frequency noise and jitter.

Disadvantages of having only one conventional high-pass filter is that the single filter, even though possibly variable in its gain output, does not accurately compensate for substantially long transmission path lengths. This is due in part to the single high-pass filter transfer function being limited by its inherent gain-bandwidth product. Even though different filter poles and zeros have been used to adaptively tune the high-pass transfer function to the left to match the higher transmission paths, this solution cannot always capture extremely long transmission lengths. Moreover, adaptively tuning a single inverse filter can add an extra degree of complexity to the overall equalizer design, in the sense that more reliance is placed on how the resistors and capacitors are fabricated and how they are tuned in the overall inverse filter design.

While FIG. 11 illustrates an adaptive gain within filter 78 and a non-adaptive gain within filter 80, it is contemplated that both gains can be adaptive if desired or, alternatively, neither gains can be adaptive if desired. It is preferred, however, that one gain be adaptive. It is also desirable that the output of the non-adaptive gain stage and the adaptive gain stage be mixed at the point of highest boost before its peak starts to flatten.

Figure 13:
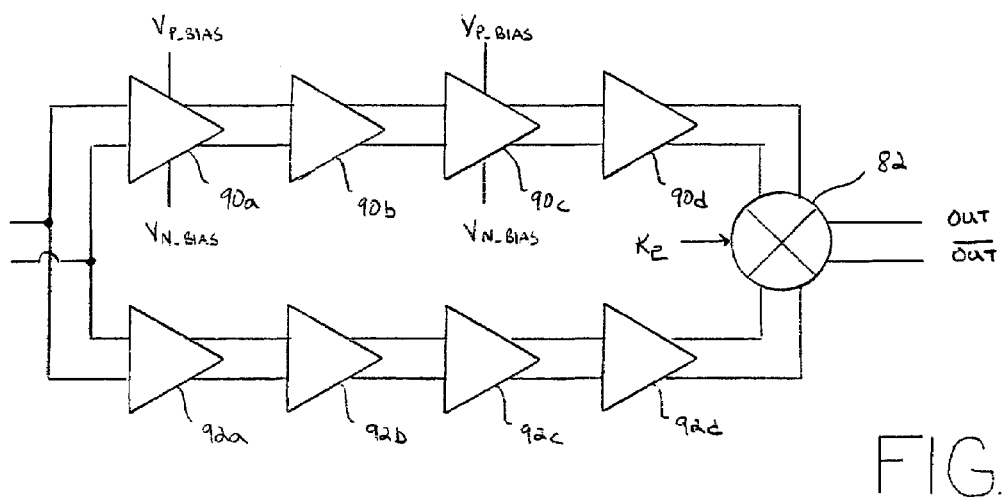
FIG. 13 is a detailed block diagram of the adaptive and non-adaptive gain stages of the inverse filter of FIG. 11.

FIG. 13 illustrates the upper and lower stages of the improved inverse cable filter 78 shown in FIG. 11. The upper cascaded stage of amplifiers corresponds to stage $A_1$ and are noted as reference numerals 90a, 90b, 90c, and 90d. The lower cascaded stage of amplifiers corresponding to non-adaptive stage $A_2$ is labeled as 92a, 92b, 92c, and 92d. Both the upper and lower stages are connected to bias resistors that DC-restore an input common mode level and allows proper transistor operation. Each of the cascaded stages 90 and 92 are made up of amplifiers and, specifically, differential amplifiers that receive true and complementary input signals. Any number of variable boost amplifiers may be used in the upper stage, and any number of fixed boost amplifiers may be used in the lower stage, depending on the requirements of a particular embodiment. For example, the variable boost amplifiers could be in the lower stage, and the fixed boost amplifiers placed in the upper stage. Still further, there may be more than just an upper and lower stage; there may be a plurality of stages implementing a mix of variable and fixed boost amplifiers, depending on the requirements of the inverse filter design. As shown, every other one of the variable boost amplifiers receives a variable input signal or bias signal, labeled as $V_{P\_BIAS}$ and $V_{N\_BIAS}$. The bias signals are established as a true and complementary values of $K_1$. Coupled to each pair of outputs from the variable and fixed boost amplifiers is mixer 82, whose degree of mixing is set by value $K_2$.

FIGS. 11-13 illustrate a single control variable $K_1$ and a single control parameter $K_2$ for use in tuning the dual parallel-connected stages of the inverse filter. $K_1$ is used to control the gain boost of the adaptive stage $A_1$. Once $K_1$ has reached a maximum value, $K_2$ can be successively turned on to a greater degree to start mixing different proportions of gain output from stages $A_1$ and $A_2$. By turning on $K_1$ to successively higher values, followed by turning on $K_2$ to successively higher values until the proper transfer function is reached, essentially one variable inverse cable filter solution is used by the equalizer design. In other words, the transfer function of the inverse cable is set by controlling only one "net" control variable representative of $K_i$, followed by $K_2$. The equalizer will only see the successive increases of $K_1$ followed by $K_2$.

Control parameter $K_2$ is used to mix between a unity gain transfer curve of a lower-pass filter 80 and a variable gain higher-pass transfer curve of filter 78. Mixing the upper and lower stages is achieved by summing different percentages of the currents that derive from both of these transfer curves. This summed current is converted back to voltage by passing it through a load resistance. Details of the mixer function and, particularly, the summed current and load resistances are described further in reference to FIG. 14.

Figure 14:
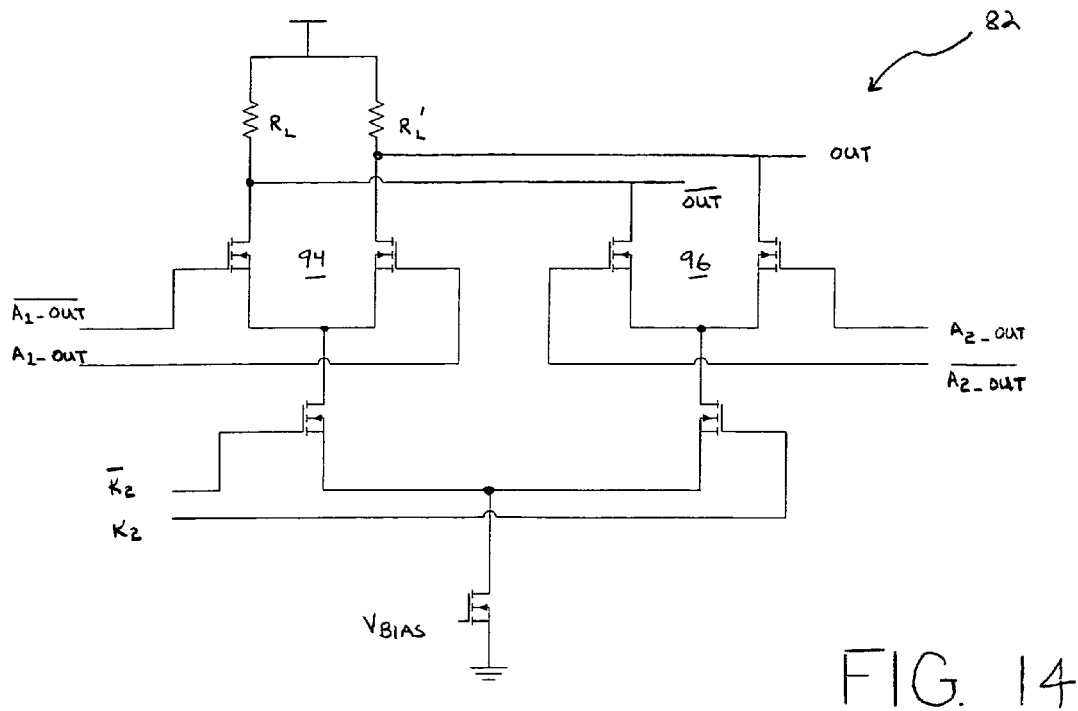
FIG. 14 is a circuit diagram of the mixer of FIGS. 11 and 13.

FIG. 14 illustrates a circuit schematic of one embodiment for realizing a mixer 82. Mixer 82 includes a pair of differential amplifiers 94 and 96. The output values (OUT and $\overline{OUT}$) are set by the outputs of the variable boost amplifiers ($A_{1\_OUT}$ and complementary $\overline{A_{1\_OUT}}$) and fixed boost amplifiers ($A_{2\_OUT}$ and complementary $\overline{A_{2\_OUT}}$). Furthermore, the portion of the output dedicated to the fixed and variable boost amplifier outputs is controlled by the control parameter $K_2$. As $K_2$ is increased, output from $A_2$ will dominate output from mixer 82. Of course, mixer circuit 82 must be properly biased ($V_{BIAS}$) to provide a current source for the differential amplifier. Typically, mixer 82 is enabled during start up. The output from mixer 82 is derived by the summed current passing through load resistors $R_L$ and $R_L'$. Mixing of amplifier stages $A_1$ and $A_2$ is achieved in a similar way that each stage in the adaptive amplifier $A_1$ is mixed. That is, two unity gain transfer functions except outputs from stages $A_1$ and $A_2$, respectively. The currents deriving from these unity gain filters are summed with particular percentages of each to achieve a final mixed transfer curve.

Both the adaptive and non-adaptive stages can be tied to a low impedance input such as, for example, 37.5 ohms. The device noise from $A_1$ and $A_2$ will not add at the input, and the worst device noise will be that provided by the non-adaptive stage $A_2$. Effectively, the inverse filter noise performance and, indeed, the overall equalizer jitter output will not be significantly worsened by the addition of the non-adaptive stage $A_2$.

Figure 15:
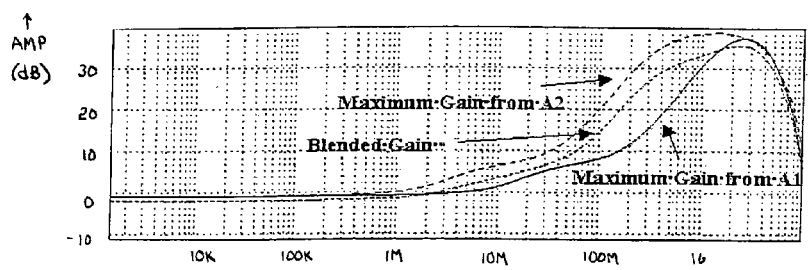
FIGS. 15 and 16 are graphs of simulated amplitude and phase output from the equalizer of FIG. 11.
Figure 16:
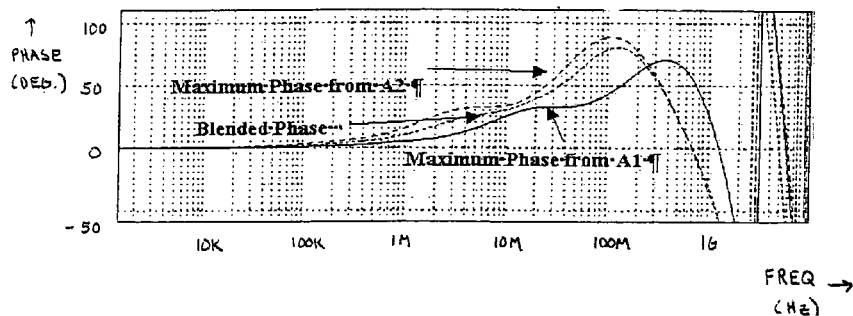

A simulation is shown in FIGS. 15 and 16 for how the resulting mixed transfer curves can emulate the magnitude and phase responses of different transmission path lengths between the two transfer curve limits. The transfer curve limits are shown as the maximum gain/phase from $A_1$ and $A_2$. Assuming that the transfer curves for $A_1$ and $A_2$ match mid-length cables and high-length cables, respectively, the output mixer can be seen to match a continuous range of cable lengths or transmission paths between these two cable-length limits. For this range of cable length, it would be desirable to match a particular cable length to a limited maximum frequency (and hence a limited maximum data rate). This corresponds to the inner section of the inverse cable filter net gain-bandwidth line, and the magnitude transfer curve of that cable length. The architecture of FIG. 11 automatically flattens the gain curves once those curves reach gain-bandwidth limits and acceptable roll-off is achieved.

The improved inverse filter of FIG. 11 is advantageous in that it compensates for a larger range of cable lengths than a conventional solution. In an alternate embodiment, a gain stage could be designed with an adaptive, tunable, artificial poll to restrict bandwidth to the transfer function desired.

The various circuit features set forth in the present disclosure are not to be interpreted as reflecting all possible features of the claimed invention. Various other modifications and alterations of the structure and method of operation of this invention will be apparent to those skilled in the art without departing from the scope and spirit of the invention. It is intended that the following claims define the scope of the present invention and that structures and methods within the scope of these claims and their equivalents be covered thereby. The specification and drawings are, therefore, to be regarded in an illustrative rather than a restrictive sense.

What is claimed is:

1. An equalizer circuit, comprising:
    a first filter coupled to a transmission line and having a frequency response substantially inverse to that of the transmission line, wherein the first filter comprises adjustable weights for adapting to a plurality of cable lengths, wherein an error signal is used to adjust the weights;
    a second filter coupled to an output of the first filter and having a frequency response that allows passage of relatively low frequency signals;
    a voltage detector coupled to an output of the second filter for measuring a peak-to-peak amplitude of the relatively low frequency signals;
    a slicer circuit coupled to the output of the first filter for producing a first logic value when the output of the first filter exceeds a threshold voltage and for producing a second logic value when the output is less than the threshold voltage;
    wherein the peak-to-peak amplitude is forwarded by the voltage detector to the slicer circuit to adjust an output amplitude from the slicer circuit, so that the output amplitude substantially matches a maximum peak amplitude of a communication signal forwarded to the transmission line;
    a first loop configured to match the first filter output with an output of the slicer circuit, wherein the first loop comprises the first filter, the slicer circuit, and an integrator; and
    a second loop configured to adjust the output amplitude from the slicer circuit, wherein the second loop comprises the second filter, the voltage detector, and the slicer circuit.

2. The equalizer circuit as recited in claim 1, wherein the voltage detector is alternatively coupled to an input of the first filter for adjusting a DC output from the first filter.

3. The equalizer circuit as recited in claim 1, wherein the first filter is an inverse filter and the second filter is a low pass filter, and wherein the output from the low pass filter approximates the maximum peak amplitude of the communication signal forwarded to the transmission line.

4. The equalizer circuit as recited in claim 1, wherein the voltage detector obtains the peak-to peak amplitude over a time exceeding two bit periods of the communication signal.

5. The equalizer circuit as recited in claim 1, wherein a gain of the slicer circuit is adjusted commensurate with the maximum peak amplitude.

6. The equalizer circuit as recited in claim 1, wherein instead of forwarding the peak-to-peak amplitude to the slicer circuit, the peak-to-peak amplitude is forwarded to the inverse filter to adjust an output amplitude from the inverse filter, so that the output amplitude of the inverse filter substantially matches the maximum peak amplitude.

7. The equalizer circuit as recited in claim 6, wherein a gain of the inverse filter is adjusted commensurate with the maximum peak amplitude.

8. The equalizer circuit as recited in claim 1, further comprising an integrator coupled to accumulate a voltage value as a function of time for the output of the first filter and for the output of the slicer circuit, and to adjust a gain within the first filter depending on a difference betveen the accumulated voltages values.

9. A communication system, comprising:
    a communication path;
    a transmitter coupled to forward a communication signal into the communication path, the forwarded communication signal having a launch amplitude; and
    a receiver having an equalizer circuit coupled to receive the communication signal from the communication path, the received communication signal having an attenuated amplitude, wherein said equalizer circuit includes:
        means for detecting the launch amplitude and for modifying the attenuated amplitude to match the launch amplitude by using a first loop and a second loop in the equalizer circuit, wherein the first loop comprises a first filter, a slicer circuit, and an integrator and the second loop comprises a second filter, a voltage peak detector, and the slicer circuit;
    wherein the slicer circuit has an adjustable output;
    the first filter comprising an inverse filter coupled to receive the communication signal from the communication path having the attenuated amplitude;
    the second filter comprises a low pass filter having a frequency response that allows a determination of the launch amplitude;
    the voltage peak detector is coupled to retain the launch amplitude and to modify an adjustable output to match the launch amplitude; and
    the integrator is coupled to modify a gain of the inverse filter depending on a difference between an output of the inverse filter and an output from the slicer circuit.

10. The communication system as recited in claim 9, wherein the communication path comprises a transmission medium selected from the group consisting of wired and wireless.

11. The communication system as recited in claim 9, wherein the slicer circuit is configured for producing a first logic value when the output of the inverse filter exceeds a threshold voltage and for producing a second logic value when the output is less than the threshold voltage.

12. The communication system as recited in claim 9, wherein the means for detecting comprises:
- the inverse filter having an adjustable output, wherein the inverse filter is coupled for receiving the communication signal from the communication channel having the attenuated amplitude;
- the low pass filter having a frequency response that allows a determination of the launch amplitude; and
- the peak detector coupled to retain the launch amplitude and to modify the adjustable output to match the launch amplitude.

13. The communication system as recited in claim 12, wherein:
- the slicer circuit has a fixed output and is configured for producing a first logic value when the output of the inverse filter exceeds a threshold voltage and for producing a second logic value when the output is less than the threshold voltage; and
- the integrator coupled to modify a gain of the inverse filter depending on a difference between an output of the inverse filter and an output from the slicer circuit.

14. A method for reducing errors at the output of a receiver, comprising:
- applying a communication signal to the receiver;
- generating a communication signal amplitude and an error signal indicative of the communication signal;
- generating a first logic value when the communication signal amplitude exceeds a threshold voltage and a second logic value when the communication signal amplitude does not exceed the threshold value;
- adjusting a plurality of filter weights according to the error signal;
- detecting a peak-to-peak amplitude of the communication signal during a time when the communication signal exhibits a first frequency, which is less than a threshold frequency amount;
- feeding back the peak-to-peak amplitude to modify the output from the receiver by adjusting magnitudes of the first and second logic values to substantially match the peak-to-peak amplitude; and
- integrating the modified receiver output to provide an output that substantially matches the peak-to-peak amplitude.

15. The method as recited in claim 14, wherein said feeding back comprises changing an amplitude from a slicer circuit included within the receiver, so that the slicer circuit amplitude is commensurate with the peak-to-peak amplitude.

16. The method as recited in claim 14, wherein said feeding back results in an amplitude from the inverse filter to be commensurate with peak-to-peak amplitude.

17. The method as recited in claim 14, wherein said integrating comprises:
- integrating changes in voltage at the output of the receiver;
- integrating changes in voltage at the output of the inverse filter;
- calculating a difference in the integrated voltages; and
- forwarding the difference to the inverse filter.

18. The method as recited in claim 14, wherein said integrating comprises adjusting the gain of a inverse filter depending on the peak-to-peak amplitude.

* * * * *

UNITED STATES PATENT AND TRADEMARK OFFICE
CERTIFICATE OF CORRECTION

| | | |
|---|---|---|
| PATENT NO. | : 7,620,101 B1 | Page 1 of 1 |
| APPLICATION NO. | : 10/950274 | |
| DATED | : November 17, 2009 | |
| INVENTOR(S) | : Julian Jenkins | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1284 days.

Signed and Sealed this

Twenty-sixth Day of October, 2010

David J. Kappos
*Director of the United States Patent and Trademark Office*